US012207033B2

(12) United States Patent
Pfitsch et al.

(10) Patent No.: US 12,207,033 B2
(45) Date of Patent: Jan. 21, 2025

(54) PRESSURE RELIEF VALVE FOR HEADPHONES

(71) Applicant: Apple Inc., Cupertino, CA (US)

(72) Inventors: Jacob A. Pfitsch, San Francisco, CA (US); Onur I. Ilkorur, Campbell, CA (US); Esge B. Andersen, Campbell, CA (US); Miikka O. Tikander, Helsinki (FI)

(73) Assignee: Apple Inc., Cupertino, CA (US)

( * ) Notice: Subject to any disclaimer, the term of this patent is extended or adjusted under 35 U.S.C. 154(b) by 68 days.

(21) Appl. No.: 17/405,914

(22) Filed: Aug. 18, 2021

(65) Prior Publication Data

US 2022/0095030 A1 Mar. 24, 2022

Related U.S. Application Data

(60) Provisional application No. 63/082,344, filed on Sep. 23, 2020.

(51) Int. Cl.
*H04R 1/10* (2006.01)
*H04R 1/28* (2006.01)

(52) U.S. Cl.
CPC ......... *H04R 1/1008* (2013.01); *H04R 1/1091* (2013.01); *H04R 1/2823* (2013.01)

(58) Field of Classification Search
CPC .. H04R 1/1008; H04R 1/1091; H04R 1/2823; H04R 1/2846; H04R 2201/10; H04R 2460/09; H04R 2460/11
USPC ............................... 381/71.6, 71.7, 371, 373
See application file for complete search history.

(56) References Cited

U.S. PATENT DOCUMENTS 9,674,600 B2 6/2017 Yuen
2009/0226023 A1* 9/2009 Akino .................. H04R 1/1008 381/374
2010/0310398 A1* 12/2010 Janse Van Rensburg .................. F04F 7/00 417/488
2014/0051483 A1* 2/2014 Schoerkmaier .. G10K 11/17853 455/570
2014/0169585 A1* 6/2014 Howes ................... H04R 1/086 381/91
2016/0150310 A1* 5/2016 Bakalos ............... H04R 1/1041 381/372
2018/0242070 A1 8/2018 Slater et al.
2019/0394556 A1 12/2019 Dory et al.

FOREIGN PATENT DOCUMENTS

FR 3133962 A1 9/2023
JP H10148181 A 6/1998
JP 2006060418 A 3/2006
(Continued)

*Primary Examiner* — Ahmad F. Matar
*Assistant Examiner* — Sabrina Diaz
(74) *Attorney, Agent, or Firm* — Aikin & Gallant, LLP

(57) ABSTRACT

A headphone comprising: two headphone earcups each comprising: an earcup housing defining an active chamber that acoustically couples a sound output side of a speaker to an ear of a user, and an inactive chamber that surrounds the active chamber; and a passive valve assembly configured to open in response to a positive pressure and a negative pressure within the active chamber to fluidly couple the active chamber to the inactive chamber and equalize a pressure between the active chamber and the inactive chamber.

20 Claims, 5 Drawing Sheets

(56) References Cited

FOREIGN PATENT DOCUMENTS

| | | | |
|---|---|---|---|
| WO | 2009113751 | A1 | 9/2009 |
| WO | 2018194686 | | 10/2018 |
| WO | 2018194689 | | 10/2018 |
| WO | 2019151988 | A1 | 8/2019 |

* cited by examiner

PRESSURE RELIEF VALVE FOR HEADPHONES

CROSS-REFERENCE TO RELATED APPLICATION

This application is a non-provisional application of co-pending U.S. Provisional Patent Application No. 63/082,344, filed Sep. 23, 2020 and incorporated herein by reference.

FIELD

An aspect of the invention is directed to a valve for headphones, including a pressure relief valve for relieving pressure experienced by a user wearing closed-back headphones. Other aspects are also described and claimed.

BACKGROUND

Whether listening to a portable media player while traveling, or to a stereo or theater system at home, consumers often choose headphones. Headphones typically include a pair of earcups which encircle the user's ears and are held together by a headband. Headphones can be classified into two general categories based on the design of the earcups, namely closed-back or open-back earcups. Closed-back earcups surround the user's ears and have a sealed (i.e., closed) back. Open-back earcups also surround the user's ears but have a back which is open to the ambient environment surrounding the earcup.

Both the closed-back and the open-back designs have their own acoustic advantages and disadvantages. For example, closed-back earcups may have good sound isolation since they are sealed off from ambient noise. In addition, the size and clamp force of the earcups may also be modified to further increase sound isolation. Features of the closed-back design, such as the sealed back, size and clamp force of the earcups allow this design to mechanically or passively attenuate ambient noise. Due to the closed design of closed-back earcups, however, pressure changes within the portion of the earcup surrounding the user's ear may be uncomfortable. Open-back earcups, on the other hand, may feel more open to the user but may not be ideal in noisy environments because their passive attenuation may not be as good as closed-back designs.

SUMMARY

An aspect of the invention relates to a headphone earcup, for example, a closed back headphone earcup, having a valve that relieves pressure from the front volume chamber of a driver (e.g., speaker) positioned therein. The valve can include a moving member, such as a valve door, between the front volume chamber (e.g., an active volume chamber) and an inactive volume or chamber of the system. The moving member may open in response to a pressure within the front volume chamber to connect the front volume chamber to the inactive volume or chamber. The front volume chamber may be considered an "active" volume or chamber because it experiences pressure changes due to sound pressure waves being directed into the volume or chamber from the sound output side of the driver (e.g., speaker). An "active" volume or chamber may be any volume or chamber that experiences pressure changes and/or cycles due to sound pressure waves or another occurrence which causes a pressure change such as pressing the earcup to the ear, running, jumping, etc. The inactive volume or chamber is a volume or chamber that does not have sound pressure waves directed into it from the driver (e.g., speaker) and/or is not subject to pressure changes and/or cycles similar to the active volume and is therefore referred to herein as an "inactive" volume or chamber. The inactive volume or chamber may be another volume or chamber that is separate from the driver front and back volume chambers (e.g., active chambers) of the speaker such that it does not directly receive a sound pressure input from the speaker. For example, the inactive volume or chamber could be acoustically isolated from the back volume chamber, and further isolated from the front volume chamber (when the valve is closed). The inactive volume could be, for example, another system volume or could also be the ambient environment.

Opening of the valve connects the front volume chamber to the inactive chamber to equalize pressure. For example, when the pressure exceeds a particular threshold (e.g., a positive pressure), the valve may open in one direction. In other aspects, when the pressure is less than a particular threshold (e.g., negative pressure), the valve can open in the opposite direction. In some aspects, the valve may include two separate check valves, one that opens only in response to a first pressure (e.g., a positive pressure) not meeting a particular threshold and one that opens only in response to a second pressure (e.g., a negative pressure) not meeting a particular threshold. In other aspects, the valve may include two valve doors, one that opens only in response to the first pressure (e.g., a positive pressure) and one that opens only in response to the second pressure (e.g., a negative pressure). In other words, the valve door (or check valve) that opens in response to one pressure may not open in response to another pressure. The valve doors and/or check valves may open independently of one another such that one may be closed while another is open. In one aspect, the valve may include a hinge and/or biasing mechanism (e.g., spring system) that biases the valve door in a closed position to facilitate opening/closing of the valve in response to the desired pressure. In some aspects, the valve may be a silicone valve in which the door is formed by a slit in the silicone membrane and the biasing mechanism is the same material as the door. Still further the valve door and/or are of the valve opening may be used to tune the valve so that it opens in response to a desired pressure and/or at a desired speed in response to the pressure. For example, a weight of the valve door and/or area of the opening or associated inactive volume could be changed to increase and/or decrease the speed at which it opens and/or the pressure required to open it. Representatively, a light door covering a large valve opening and/or volume would allow for faster opening, while a heavy door covering a small valve opening and/or volume would allow for slower opening of the valve door. As previously discussed, the pressure (or pressure change) within the front volume chamber that causes the valve to open may be caused by sound pressure waves from the driver (e.g., speaker), a user pressing the earcup against the ear, running, jumping, etc, or a combination of any of these occurrences. A slower or faster valve opening could be desired depending on the circumstances. For example, a faster opening valve may be desired to relieve a large pressure change that could occur when the earcup is pressed on the user's ear and a slower opening valve may be desired when the pressure change is a smaller pressure change caused by running or jumping. In addition, in some aspects, the earcup may have a leak vent, barometric vent ("b-vent") or other type of vent or opening that connects the front volume chamber to the inactive volume or chamber to further help relieve pressure within the earcup. For example, the vent could be formed in the valve or another portion of the earcup that can be used to connect the front volume chamber to the inactive volume or chamber.

In another aspect, a headphone includes two headphone earcups each including an earcup housing defining an active chamber that acoustically couples a sound output side of a speaker to an ear of a user, and an inactive chamber that surrounds the active chamber; and a passive valve assembly configured to open in response to a pressure change (e.g., positive or negative pressure change) within the active chamber to fluidly couple the active chamber to the inactive chamber and equalize a pressure between the active chamber and the inactive chamber. In some aspects, the active chamber forms a front volume chamber of the speaker that is acoustically isolated from a back volume chamber of the speaker and is dimensioned to surround an ear of the use. In some aspects, the inactive chamber is closed to an ambient environment and acoustically isolated from a back volume chamber of the speaker. In other aspects, the inactive chamber is open to an ambient environment. The inactive chamber may be acoustically isolated from a back volume chamber of the speaker. The valve assembly may include a first valve door configured to open in only a first direction in response to a positive pressure change exceeding a threshold pressure. The valve assembly may include a second valve door configured to open in only a second direction opposite the first direction in response to a negative pressure change less than a threshold pressure. The valve assembly may include a valve door coupled to the earphone housing by a biasing mechanism that biases the valve door toward a closed position. In some aspects, the valve assembly may include a check valve. In some aspects, the headphone earcup may further include a leak vent that couples the active chamber to the inactive chamber or an ambient environment. In some aspects, a sound pressure wave output by the sound output side of the speaker may cause the positive pressure in the active chamber and opens the valve assembly. In some aspects, the positive pressure or the negative pressure is caused by a user pressing at least one of the pair of headphone earcups against their ear. In some aspects, the headphone earcups are closed back headphone earcups.

In another aspect, a closed back headphone earcup includes an earcup housing defining a front volume acoustically coupled to a sound output side of a driver, a back volume coupled to a back side of the driver and that is acoustically isolated from the front volume, and an outer volume that is acoustically isolated from the back volume of the driver; and a valve assembly between the front volume and the outer volume, wherein the valve assembly is configured to move in a first direction in response to a first pressure within the front volume and a second direction different from the first direction in response to a second pressure within the front volume, and wherein the movement of the valve assembly in the first direction and the second direction opens the front volume to the outer volume to equalize a pressure between the front volume and the outer volume. In some aspects, the valve assembly includes a first valve door configured to open in the first direction and a second valve door configured to open in the second direction. In some aspects, the first valve door remains closed when the second valve door opens in the second direction, and the second valve door remains closed when the first valve door opens in the first direction. In still further aspects, a size of the first valve door or a size of the second valve door is tuned to modify a speed at which the first valve door or the second valve door opens in response to the first pressure or the second pressure. The first pressure may be a positive pressure within the front volume that is greater than a threshold pressure. In some aspects, the second pressure may be a negative pressure within the front volume that is less than a threshold pressure. In some aspects, a leak vent may be formed in the valve assembly that couples the front volume to the outer volume.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect in this disclosure are not necessarily to the same aspect, and they mean at least one.

DETAILED DESCRIPTION

In this section we shall explain several preferred aspects of this disclosure with reference to the appended drawings. Whenever the shapes, relative positions and other aspects of the parts described are not clearly defined, the scope of the disclosure is not limited only to the parts shown, which are meant merely for the purpose of illustration. Also, while numerous details are set forth, it is understood that some aspects of the disclosure may be practiced without these details. In other instances, well-known structures and techniques have not been shown in detail so as not to obscure the understanding of this description.

Figure 1:
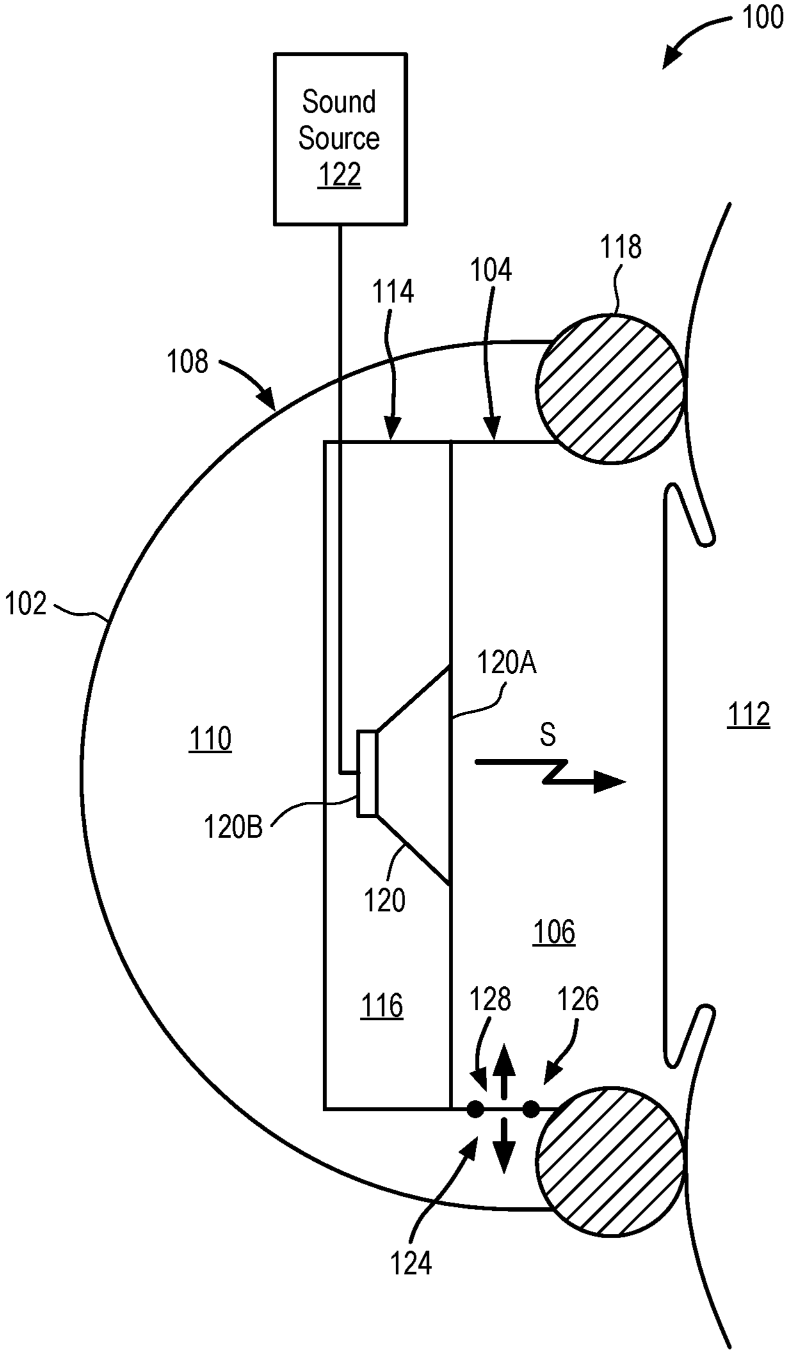
FIG. 1 illustrates a schematic diagram of one aspect of a headphone earcup having a valve assembly.

FIG. 1 illustrates a schematic diagram of one aspect of a headphone earcup having a valve assembly. It should be understood that the figures illustrate only one of a pair of left and right ear earcups of headphone 100, which can be connected by a head band (not shown). Thus, each of the features described in reference to the earcup of headphone 100 illustrated in the drawings should be understood as applying to the other earcup of headphone 100. Earcup housing 102 forms an enclosure dimensioned to encircle and cover a user's ear. In this aspect, earcup housing 102 includes a first chamber 104 defining an active or front volume 106 and a second chamber 108 defining an inactive volume 110. First chamber 104 and front volume chamber 106 may surround the ear 112 when headphone 100 is positioned on the user's head. In some cases, an earcup pad 118 may be positioned around first chamber 104 of earcup housing 102 to ensure a comfortable fit and/or to seal the earcup around and/or to the user's ear. Second chamber 108 and inactive volume 110 may be a substantially closed chamber and/or volume positioned behind the first chamber 104 (as viewed in FIG. 1). For example, second chamber 108 and inactive volume 110 may be part of the system volume that surrounds other system components enclosed within the housing 102 but serves no particular acoustic function. Housing 102 may further define a third chamber 114 that encloses another volume or back volume 116. The back volume 116 of the third chamber 114 may be acoustically isolated from the inactive volume 110 of the second chamber 108 and the active volume 106 of the first chamber 104.

A driver 116 for outputting a music signal (S) in a direction of ear 112 may be mounted within housing 102. Driver 116 may be any type of electric-to-acoustic transducer having a pressure sensitive diaphragm and circuitry configured to produce a sound in response to an electrical audio signal input (e.g., a loudspeaker). The electrical audio signal may be a music signal input to driver 120 by sound source 122. Sound source 122 may be any type of audio device capable of outputting an audio signal, for example, an audio electronic device such as a portable music player, home stereo system or home theater system capable of outputting an audio signal. The first chamber 104 defining the front volume 106 may be acoustically coupled to the sound output side 120A of the driver 120 and allow for sound to pass from driver 120 to the user's ear 112. In this aspect, the first chamber 104 and front volume 106 may be dimensioned to surround the ear as previously discussed. The third chamber 114 defining back volume 116 may be acoustically coupled to the back side 120B (e.g., non-sound output side) of the driver 120 and acoustically isolated from the first chamber 104 and second chamber 108 as previously discussed.

In order to improve an acoustic performance and comfort of headphone 100, headphone 100 may include a valve assembly 124. The valve assembly 124 may include a movable member 126 positioned over an opening 128 formed through earcup housing 102. The opening 128 is between the first chamber 104 and the second chamber 108. Accordingly, when the moving member 126 is in a closed position, opening 128 is covered and the first chamber 104 is not open to the second chamber 108. In other words, in the open position, air may not travel between the front volume 106 and the outer volume 110. On the other hand, when the moving member 126 is in an open position, the opening 128 is not covered and the first chamber 104 is open to the second chamber 108. In other words, air may move between the front volume 106 and the outer volume 110. In this aspect, valve assembly 124 may be used to equalize a pressure within first chamber 104 and/or between first chamber 104 and second chamber 108. For example, when a pressure above a desired threshold within first chamber 104 occurs, the valve assembly 124 may open so that the first chamber 104 is open to the second chamber 108 and air can pass from the first chamber 104 to the second chamber 108 to relieve (e.g., reduce) the pressure. The particular operation of the valve assembly 124 will be described in more detail in reference to FIG. 3-FIG. 6.

Valve assembly 124 may be a passive or mechanical valve used to equalize pressure within first chamber 104 by opening and/or closing first chamber 104 to second chamber 108. Valve assembly 124 may be considered a passive valve (as opposed to an active valve) because it can open or close in the absence of an electrical input. For example, valve assembly 124 may open or close in response to a pressure, pressure change and/or pressure difference within the first chamber 104 and/or between the first chamber 104 and the second chamber 108. Valve assembly 124 may therefore also be considered a pressure sensitive valve. This is in contrast to an active valve which requires an electrical input to open or close the valve.

Figure 2:
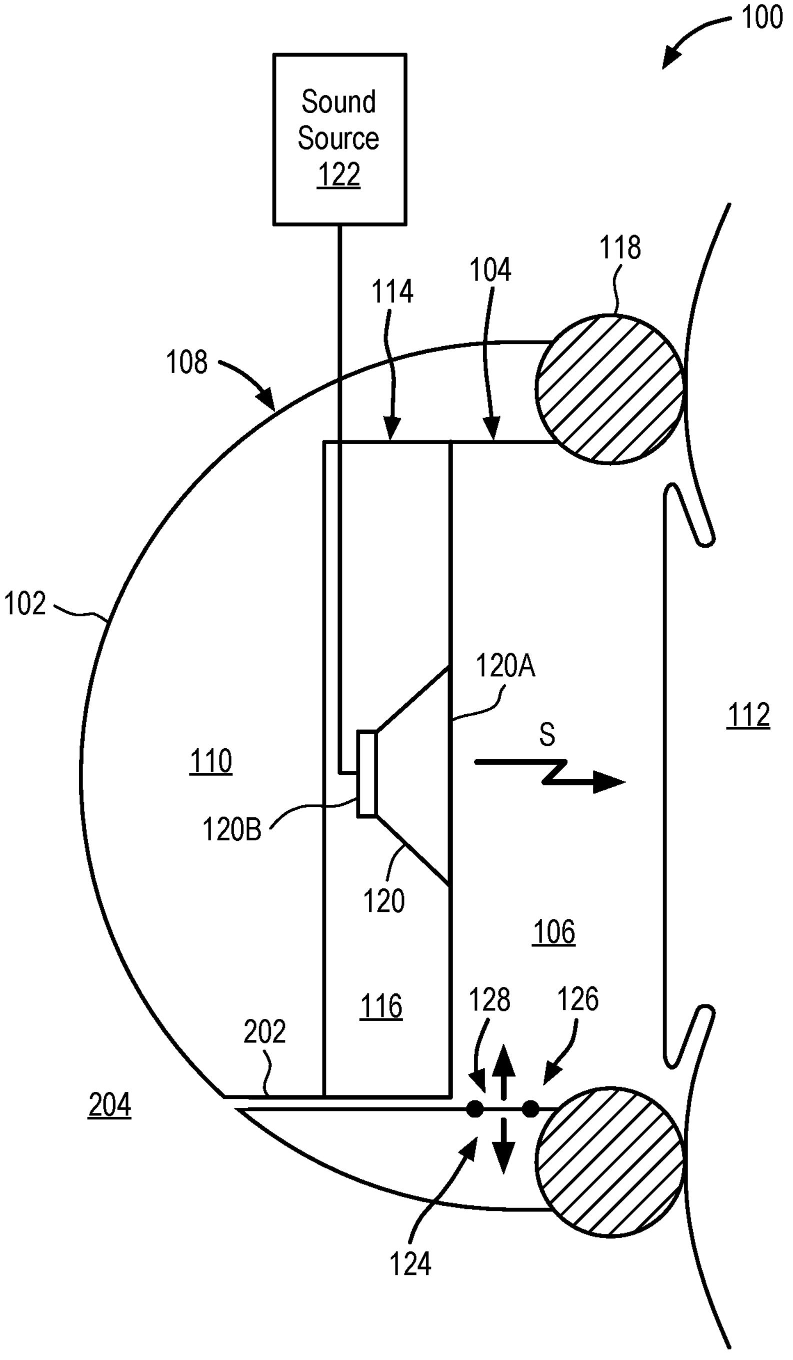
FIG. 2 illustrates a schematic diagram of another aspect of a headphone earcup having a valve assembly.

In addition, in some aspects, first chamber 104 may include an additional opening or vent 202 to an inactive volume and/or chamber as shown in FIG. 2. Representatively, in some aspects, vent 202 may vent the first chamber 104 to the ambient environment 204 surrounding the housing 102. For example, vent 202 may be a b-vent that runs through the housing 102 from the front volume 106 to the ambient environment. In other aspects, vent 202 may be formed in the valve assembly 124 as will be described in more detail in reference to FIG. 3 and FIG. 5. Vent 202 may further help to relieve pressure within front volume 106. For example, in some aspects, vent 202 may allow for a constant flow of air between the ambient environment 204 and front volume 106 to relieve small pressures and/or pressure changes within front volume 106 while valve assembly 124 opens in response to larger and/or more sudden pressures and/or pressure changes within the front volume 106 to relieve larger pressure changes.

Figure 3:
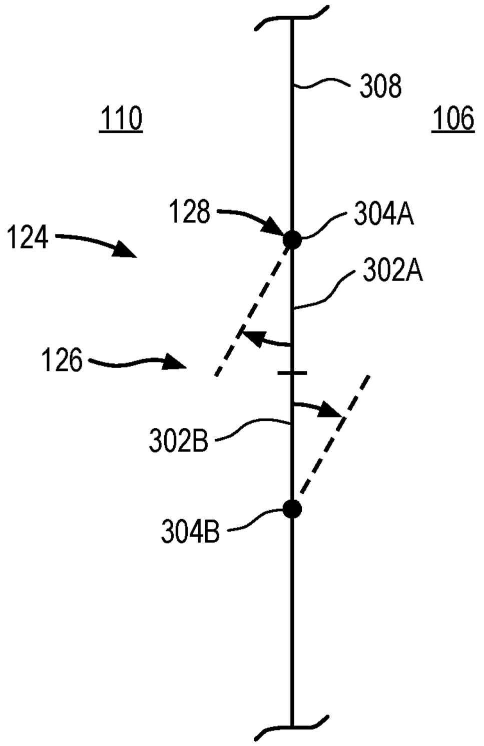
FIG. 3 illustrates a magnified schematic diagram of an aspect of the valve assembly of FIG. 1 or FIG. 2.

The particular aspects and operations of valve assembly 124 will now be described in reference to FIG. 3-FIG. 6. Representatively, FIG. 3-FIG. 6 illustrate magnified cross-sectional side views of the valve assembly described in reference to FIG. 1-FIG. 2. Referring now to FIG. 3, FIG. 3 illustrates valve assembly 124 including a moving member 126 positioned over the opening 128 formed within wall 308 between front volume 106 (e.g., an active volume) and outer volume 110 (e.g., an inactive volume). As previously discussed, the front volume 106 may be an active volume defined by the driver front volume chamber while the outer volume 110 may be an inactive volume within an outer chamber of the earphone housing and/or the ambient environment. The moving member 126 may be any type of valve door capable of opening in response to a pressure or pressure change within front volume 106 to equalize the pressure within and/or between front volume 106 and outer volume 110. Representatively, moving member 126 may include a first valve door 302A and a second valve door 302B that are movably coupled to the wall 308 at pivot points 304A, 304B, respectively. In some aspects, each of the first and second valve doors 302A, 302B may be operable to open independently from one another in a single direction and in response to different pressures and/or pressure changes. For example, in one aspect, first valve door 302A may be operable to open only in the direction shown by the arrow (e.g., into the outer volume 110) in response to a first pressure or pressure change ($P_1$) that exceeds a predetermined threshold pressure ($P_{TH1}$). For example, the first pressure or pressure change ($P_1$) may be a positive pressure (e.g., a pressure greater than that of the atmosphere) and/or a pressure that exceeds a predetermined threshold pressure ($P_{TH1}$) (e.g., a pressure greater than atmospheric pressure and/or a sound pressure output by the speaker). Representatively, the first pressure or pressure change ($P_1$) could be a rapid pressure increase caused by the user pressing the earcup against the ear, running and/or jumping. The valve door 302A may be tuned to open as shown by the dashed line in response to this particular pressure change. The valve door 302A may further be tuned to return to the closed position once the pressure between outer volume 110 and front volume 106 equalizes.

Valve door 302B, on the other hand, remains closed in response to the first pressure or pressure change ($P_1$). Rather, valve door 302B may instead open only in the direction shown by the corresponding arrow (e.g., into the front volume 106) in response to a second pressure change ($P_2$). The second pressure or pressure change ($P_2$) may be different than the first pressure or pressure change ($P_1$). For example, the second pressure or pressure change ($P_2$) may be a negative pressure (e.g., a pressure less than that of the atmosphere) and/or a pressure within the front volume 106 which is less than a predetermined threshold pressure ($P_{TH2}$) (e.g., a pressure less than atmospheric pressure and/or a sound pressure output by the speaker). Representatively, the second pressure or pressure change ($P_2$) could be a rapid pressure decrease caused by the user removing the earcup from their head, running and/or jumping. Valve door 302B may be tuned to open only in the direction illustrated by the arrow (e.g., into front volume 106) in response to the second pressure or pressure change ($P_2$). Valve door 302A, however, remains closed and does not open in response to this second pressure or pressure change ($P_2$). In this aspect, valve doors 302A and 302B may be understood as being tuned to only open in response to different pressures and/or pressure changes so that one opens while one remains closed. The opening of only one door at a time helps to regulate the air flow between chambers 106, 110. For example, in some instances both a positive pressure may occur in first volume 106 and at the same time a negative pressure may occur in the outer volume 110. The first valve door 302A will open in response to the positive pressure in the first volume 106. The second valve door 302B, however, may only open into the front volume 106. Since the second valve door 302B cannot open in the direction of the outer volume 110, the negative pressure within the outer volume 110 will not cause it to open. In this aspect, air is allowed to move from the front volume 106 to the outer volume 110 due to the opening of the first valve door 302A but is blocked from moving from the outer volume 110 to the front volume 106 by the closed second valve door 302B. This, in turn, equalizes the pressure within the front volume 106.

The valve doors 302A-B may be coupled to the housing wall 308 at pivot points 304A-B. Pivot points 304A-B may be hinges that allow the valve doors 302A-B to only open in the previously discussed directions in response to the desired pressure (e.g., $P_1$ or $P_2$). In some aspects, the hinges may be formed of a same material as the valve doors 302A-B while in other aspects, they may be made of a different material. For example, in some aspects the valve may be a silicone valve and the doors 302A-B may be formed by cutting a slit(s) within the silicone membrane. In this aspect, the hinges would also be formed of the same silicone material as the doors 302A-B. In other aspects, the valve may be made of other materials and the doors 302A-B may be coupled to the wall at pivot points 304A-B by another type of hinge, and in some cases, may also include a biasing mechanism. For example, the pivot points 304A-B may include a spring or other biasing mechanism to bias the valve doors 302A-B toward a closed position. In this aspect, valve doors 302A-B may remain closed until a desired pressure and/or pressure change occurs and causes them to open and may return to the closed position when the pressure equalizes.

Figure 4:
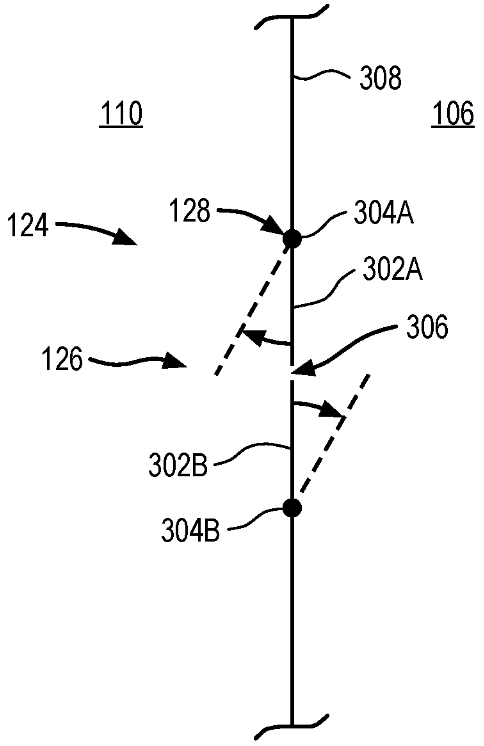
FIG. 4 illustrates a magnified schematic diagram of an aspect of the valve assembly of FIG. 1 or FIG. 2.

FIG. 4 is a magnified view of another aspect of the valve assembly 124. In particular, valve assembly 124 in FIG. 4 is substantially similar to the valve assembly previously discussed except it also includes a vent 306 within the valve to further help equalize pressure. For example, in some aspects, vent 306 may allow for a constant flow of air between the front volume 106 and the outer volume 110. In this aspect, vent 306 may be used to relieve small pressures and/or pressure changes within front volume 106 while valve assembly 124 could be tuned to open only in response to larger and/or more sudden pressures and/or pressure changes within the front volume 106 to relieve larger pressure changes. The vent 306 could be a b-vent and be used in addition to and/or instead of the housing b-vent previously described in reference to FIG. 2.

Figure 5:
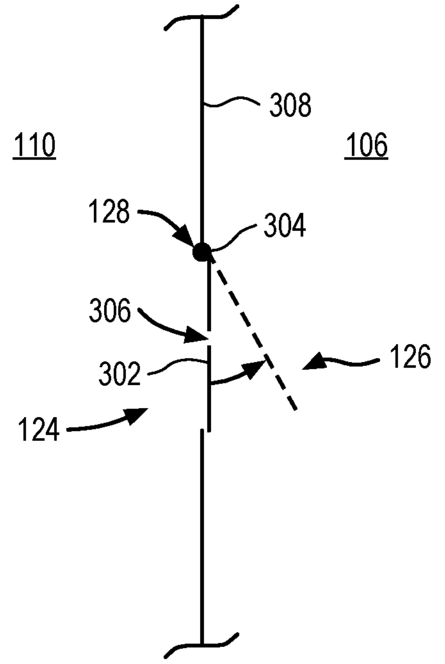
FIG. 5 illustrates a magnified schematic diagram of an aspect of the valve assembly of FIG. 1 or FIG. 2.

FIG. 5 is a magnified view of another aspect of the valve assembly 124. In particular, valve assembly 124 in FIG. 5 is substantially similar to the valve assembly previously discussed except it is a single valve door 302 that includes a vent 306 through the door. For example, valve assembly 124 could include a single check valve or multiple check valves that include a valve door that opens in a single direction in response to a particular pressure and/or pressure change to equalize the pressure. In some aspects, although not shown, the valve assembly 124 could include two different valve doors 302 covering different openings 128 within the housing wall 308 to relieve different pressure occurrences (e.g., negative pressure and positive pressure changes) as previously discussed. The vent 306 could be a b-vent and be used in addition to and/or instead of the housing b-vent previously described in reference to FIG. 2.

Figure 6:
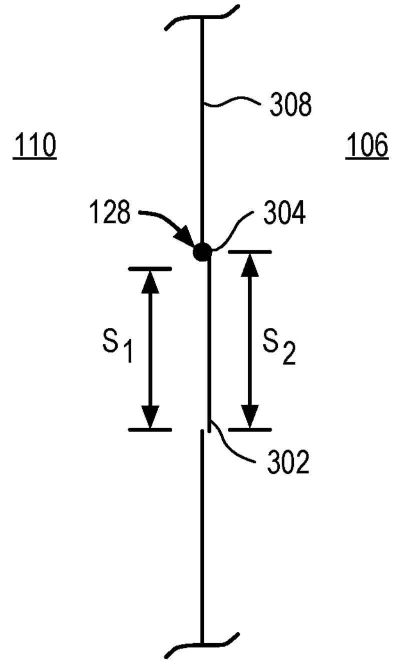
FIG. 6 illustrates a magnified schematic diagram of an aspect of the valve assembly of FIG. 1 or FIG. 2.

In addition, as previously discussed, any one or more of the previously discussed valve assemblies 124 may be tuned to open in response to a particular pressure and/or pressure change. For example, in some aspects, the weight of the valve door (e.g., valve doors 302A-B), the size of the valve opening (e.g., opening 128) and/or the size of the associated inactive volume (e.g., outer volume 110) may be specially selected so that the valve assembly 124 opens and/or closes in response to a desired pressure. For example, as shown in FIG. 6 the size (S1) of the valve opening 128 or the size (S2) of the door 302 may be specially selected so that the valve opens in response to the desired pressure and at the desired rate. Representatively, as previously discussed, a size of the valve door could be changed to change a weight of the valve door to increase and/or decrease the speed at which it opens and/or the pressure required to open it. In addition, a size of the opening 128 and/or the associated volume 110 so that the area of air exchange is larger or small to increase and/or decrease the speed at which the door opens and/or closes. Representatively, a light door covering a large valve opening and/or volume would allow for faster opening of the door 302. On the other hand, a heavy door covering a small valve opening and/or volume would allow for slower opening of the valve door 302. As previously discussed, the pressure (or pressure change) within the front volume chamber that causes the valve to open may be caused by sound pressure waves from the driver (e.g., speaker), a user pressing the earcup against the ear, running, jumping, etc., or a combination of any of these occurrences. A slower or faster valve opening could be desired depending on the circumstances. For example, a faster opening valve may be desired to relieve a large pressure change that could occur when the earcup is pressed on the user's ear and a slower opening valve may be desired when the pressure change is a smaller pressure change caused by running or jumping.

Figure 7:
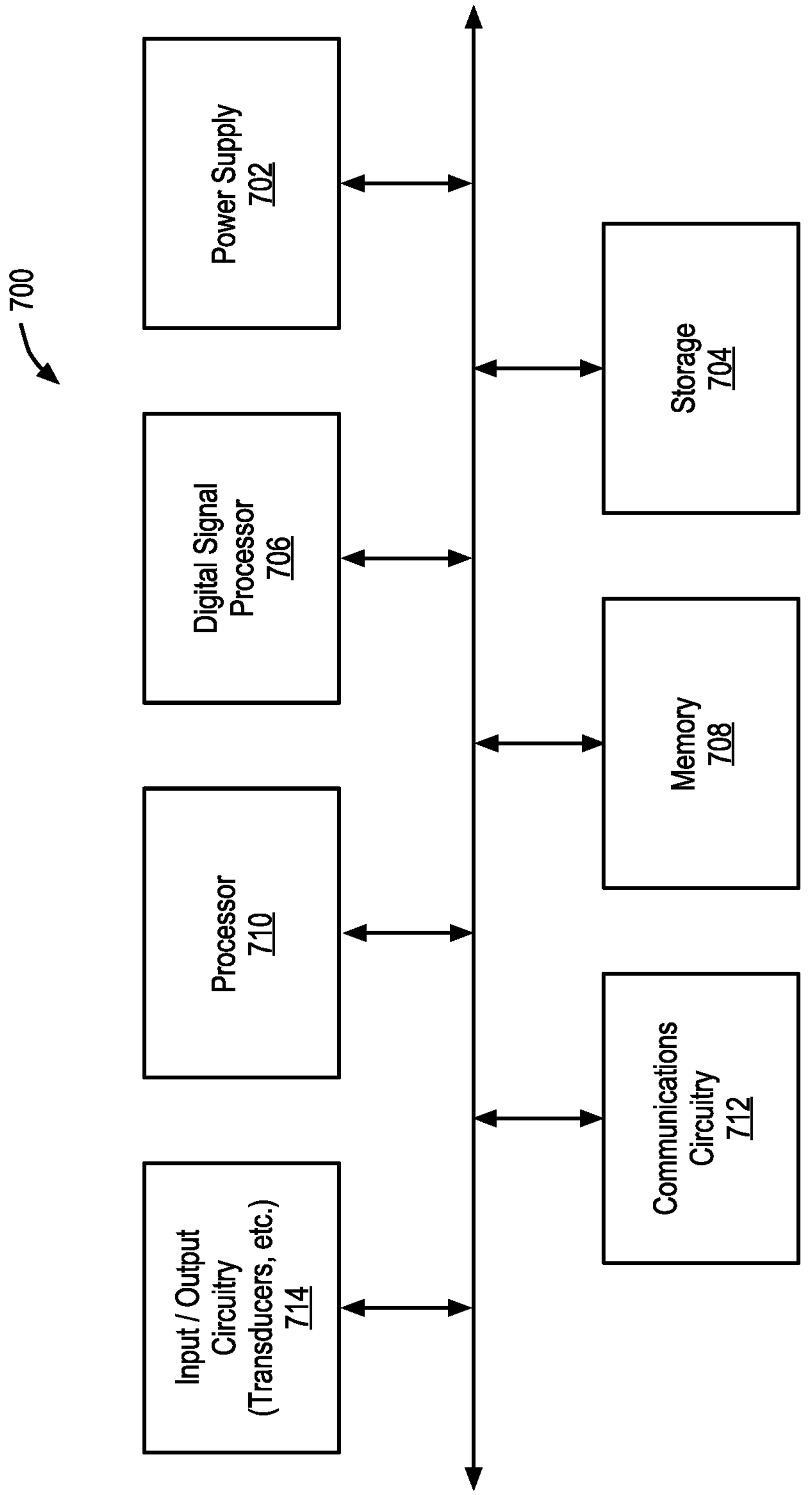
FIG. 7 illustrates a simplified schematic view of one aspect of an electronic device in which the valve assembly may be implemented.

FIG. 7 illustrates a simplified schematic view of one aspect of an electronic device in which a valve assembly as described herein may be implemented. For example, headphone 100 of FIGS. 1-2 are examples of systems that can include some or all of the circuitry illustrated by electronic device 700.

Electronic device 700 can include, for example, power supply 702, storage 704, signal processor 706, memory 708, processor 710, communication circuitry 712, and input/output circuitry 714. In some aspects, electronic device 700 can include more than one of each component of circuitry, but for the sake of simplicity, only one of each is shown in FIG. 7. In addition, one skilled in the art would appreciate that the functionality of certain components can be combined or omitted and that additional or less components, which are not shown in FIGS. 1-6, can be included in, for example, headphone 100.

Power supply 702 can provide power to the components of electronic device 700. In some aspects, power supply 702 can be coupled to a power grid such as, for example, a wall outlet. In some aspects, power supply 702 can include one or more batteries for providing power to a headphone or other type of electronic device associated with the headphone. As another example, power supply 702 can be configured to generate power from a natural source (e.g., solar power using solar cells).

Storage 704 can include, for example, a hard-drive, flash memory, cache, ROM, and/or RAM. Additionally, storage 704 can be local to and/or remote from electronic device 700. For example, storage 704 can include integrated storage medium, removable storage medium, storage space on a remote server, wireless storage medium, or any combination thereof. Furthermore, storage 704 can store data such as, for example, system data, user profile data, and any other relevant data.

Signal processor 706 can be, for example a digital signal processor, used for real-time processing of digital signals that are converted from analog signals by, for example, input/output circuitry 714. After processing of the digital signals has been completed, the digital signals could then be converted back into analog signals.

Memory 708 can include any form of temporary memory such as RAM, buffers, and/or cache. Memory 708 can also be used for storing data used to operate electronic device applications (e.g., operation system instructions).

In addition to signal processor 706, electronic device 700 can additionally contain general processor 710. Processor 710 can be capable of interpreting system instructions and processing data. For example, processor 710 can be capable of executing instructions or programs such as system applications, firmware applications, and/or any other application. Additionally, processor 710 has the capability to execute instructions in order to communicate with any or all of the components of electronic device 700.

Communication circuitry 712 may be any suitable communications circuitry operative to initiate a communications request, connect to a communications network, and/or to transmit communications data to one or more servers or devices within the communications network. For example, communications circuitry 712 may support one or more of Wi-Fi (e.g., a 802.11 protocol), Bluetooth®, high frequency systems, infrared, GSM, GSM plus EDGE, CDMA, or any other communication protocol and/or any combination thereof.

Input/output circuitry 714 can convert (and encode/decode, if necessary) analog signals and other signals (e.g., physical contact inputs, physical movements, analog audio signals, etc.) into digital data. Input/output circuitry 714 can also convert digital data into any other type of signal. The digital data can be provided to and received from processor 710, storage 704, memory 708, signal processor 706, or any other component of electronic device 700. Input/output circuitry 714 can be used to interface with any suitable input or output devices. Furthermore, electronic device 700 can include specialized input circuitry associated with input devices such as, for example, one or more proximity sensors, accelerometers, etc. Electronic device 700 can also include specialized output circuitry associated with output devices such as, for example, one or more speakers, earphones, etc.

Lastly, bus 716 can provide a data transfer path for transferring data to, from, or between processor 710, storage 704, memory 708, communications circuitry 712, and any other component included in electronic device 700. Although bus 716 is illustrated as a single component in FIG. 7, one skilled in the art would appreciate that electronic device 700 may include one or more components.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting. In addition, to aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What is claimed is:

1. A headphone comprising:

two headphone earcups each comprising:

an earcup housing defining an active chamber that acoustically couples a sound output side of a speaker to an ear of a user, an inactive chamber that surrounds the active chamber, and an opening between the active chamber and the inactive chamber; and a passive valve assembly coupled to the opening and comprising a first valve member configured to move in only a first direction in response to a first pressure within the active chamber and a second valve member configured to move in only a second different direction that is opposite the first direction in response to a second pressure within the active chamber to allow for a passage of fluid through the opening between the active chamber and the inactive chamber to equalize a pressure between the active chamber and the inactive chamber.

2. The headphone of claim 1 wherein the active chamber forms a front volume chamber of the speaker that is acoustically isolated from a back volume chamber of the speaker and is dimensioned to surround the ear of the user.

3. The headphone of claim 1 wherein the inactive chamber is closed to an ambient environment and acoustically isolated from a back volume chamber of the speaker.

4. The headphone of claim 1 wherein the inactive chamber is open to an ambient environment.

5. The headphone of claim 1 wherein the inactive chamber is acoustically isolated from a back volume chamber of the speaker.

6. The headphone of claim 1 wherein the first valve member is a first valve door configured to open in only the first direction and the first pressure is a positive pressure change exceeding a threshold pressure.

7. The headphone of claim 1 wherein the second valve member is a second valve door configured to open in only the second different direction and the second pressure is a negative pressure change less than a threshold pressure.

8. The headphone of claim 1 wherein the first valve member or the second valve member comprises a valve door coupled to the earcup housing by a biasing mechanism that biases the valve door toward a closed position.

9. The headphone of claim 1 wherein the valve assembly comprises a check valve.

10. The headphone of claim 1 further comprising a leak vent that couples the active chamber to the inactive chamber or an ambient environment.

11. The headphone of claim 1 wherein a sound pressure wave output by the sound output side of the speaker causes a positive pressure change in the active chamber and opens the valve assembly.

12. The headphone of claim 1 wherein the first pressure or the second pressure is a positive pressure change or a negative pressure change caused by the user pressing at least one of the headphone earcups against their ear.

13. The headphone of claim 1 wherein the headphone earcups are closed back headphone earcups.

14. A closed back headphone earcup comprising:

an earcup housing defining a front volume acoustically coupled to a sound output side of a driver, a back volume coupled to a back side of the driver and that is acoustically isolated from the front volume, and an outer volume that is acoustically isolated from the back volume of the driver; and a valve assembly coupled to a single opening between the front volume and the outer volume, wherein the valve assembly comprises a first valve member configured to move in a first direction in response to a first pressure within the front volume and a second valve member configured to move in a second direction different from the first direction in response to a second pressure within the front volume and remain closed when the first valve member moves in the first direction, and wherein a movement of the valve assembly in the first direction and the second direction opens the front volume to the outer volume to equalize a pressure between the front volume and the outer volume.

15. The headphone earcup of claim 14 wherein the first valve member comprises a first valve door configured to open in the first direction and the second valve member comprises a second valve door configured to open in the second direction.

16. The headphone earcup of claim 14 wherein the first valve member remains closed when the second valve member opens in the second direction.

17. The headphone earcup of claim 14 wherein a size of the first valve member or a size of the second valve member is tuned to modify a speed at which the first valve member or the second valve member opens in response to the first pressure or the second pressure.

18. The headphone earcup of claim 14 wherein the first pressure comprises a positive pressure within the front volume that is greater than a threshold pressure.

19. The headphone earcup of claim 14 wherein the second pressure comprises a negative pressure within the front volume that is less than a threshold pressure.

20. The headphone of claim 14 further comprising a vent formed in the valve assembly that couples the front volume to the outer volume.

* * * * *